United States Patent
Horiuchi et al.

(10) Patent No.: US 9,134,885 B2
(45) Date of Patent: Sep. 15, 2015

(54) INFORMATION PROCESSING APPARATUS, DISPLAY PROCESSING METHOD, PROGRAM, AND RECORDING MEDIUM TO DISPLAY OFF-SCREEN OBJECTS IN SUB-WINDOWS

(71) Applicant: International Business Machines Corporation, Armonk, NY (US)

(72) Inventors: Yoshio Horiuchi, Hiratsuka (JP); Harumi Itoh, Machida (JP); Tadahiko Nakamura, Yokohama (JP); Masato Suzuki, Warabi (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 258 days.

(21) Appl. No.: 13/678,129

(22) Filed: Nov. 15, 2012

(65) Prior Publication Data

US 2013/0167071 A1    Jun. 27, 2013

(30) Foreign Application Priority Data

Dec. 21, 2011 (JP) .................................. 2011-279596

(51) Int. Cl.
    G06F 3/048       (2013.01)
    G06F 3/0484      (2013.01)
(52) U.S. Cl.
    CPC .... G06F 3/0484 (2013.01); *G06F 2203/04803* (2013.01)
(58) Field of Classification Search
    CPC ...... G06F 3/0481; G06F 3/0482; G06F 3/048
    See application file for complete search history.

(56) References Cited

U.S. PATENT DOCUMENTS

| | | | | |
|---|---|---|---|---|
| 5,337,405 A * | 8/1994 | Lindauer et al. | | 715/210 |
| 6,088,707 A * | 7/2000 | Bates et al. | | 715/235 |
| 6,392,661 B1 * | 5/2002 | Tankersley | | 345/660 |
| 7,793,230 B2 * | 9/2010 | Burns et al. | | 715/787 |
| 8,782,560 B2 * | 7/2014 | Purdy et al. | | 715/834 |
| 2003/0156124 A1 * | 8/2003 | Good et al. | | 345/620 |
| 2005/0091604 A1 * | 4/2005 | Davis | | 715/772 |
| 2005/0132305 A1 * | 6/2005 | Guichard et al. | | 715/855 |
| 2007/0050129 A1 * | 3/2007 | Salmre | | 701/207 |
| 2009/0169060 A1 * | 7/2009 | Faenger et al. | | 382/113 |
| 2009/0281720 A1 * | 11/2009 | Jakobson | | 701/202 |
| 2010/0122194 A1 * | 5/2010 | Rogers | | 715/769 |
| 2010/0138765 A1 * | 6/2010 | Rainisto | | 715/766 |

(Continued)

FOREIGN PATENT DOCUMENTS

JP    2139625 A    5/1990
JP    09-044328 A    2/1997

(Continued)

*Primary Examiner* — Amy M Levy
(74) *Attorney, Agent, or Firm* — Marcia L. Doubet

(57) ABSTRACT

An embodiment provides an information processing apparatus having software running thereon, the software having a window as a user interface for displaying a plurality of objects on a display apparatus, the information processing apparatus performing: in response to a user selecting a desired region in a display region of the display apparatus, putting a mark on the region and an object which is present in the region; when the object of the marked region is not displayed in the window, displaying the object in the marked region in a periphery of the window as a sub-window; and closing the sub-window in response to the object in the marked region being displayed in the window.

12 Claims, 21 Drawing Sheets

(56) References Cited

U.S. PATENT DOCUMENTS

| | | | |
|---|---|---|---|
| 2011/0131481 A1* | 6/2011 | Vronay et al. | 715/227 |
| 2011/0145724 A1 | 6/2011 | Tsai et al. | |
| 2011/0169959 A1* | 7/2011 | DeAngelis et al. | 348/157 |
| 2013/0093781 A1* | 4/2013 | Suzuki et al. | 345/581 |
| 2013/0205245 A1* | 8/2013 | Croll et al. | 715/781 |
| 2013/0297206 A1* | 11/2013 | Heng et al. | 701/532 |
| 2014/0164958 A1* | 6/2014 | Mitchell et al. | 715/753 |

FOREIGN PATENT DOCUMENTS

| | | |
|---|---|---|
| JP | 10-124280 A | 5/1998 |
| JP | 2004145724 A | 5/2004 |
| JP | 2005-502098 A | 1/2005 |
| JP | 2009-193196 A | 8/2009 |
| JP | 2013-077211 A | 4/2013 |

\* cited by examiner

FIG. 21

| MARK NUMBER | REGION INFORMATION | OBJECTS |
|---|---|---|
| 1 | (50, 400) - (100, 450) | AA BB |
| 2 | (400, 450) - (440, 490) | E F |
| 3 | (600, 200) - (650, 250) | C D |
| ... | ... | ... |

FIG. 22

| OBJECT | RELATED OBJECTS |
|---|---|
| ABC | AA BB C |
| DEF | D E F |
| ... | ... | ism
INFORMATION PROCESSING APPARATUS, DISPLAY PROCESSING METHOD, PROGRAM, AND RECORDING MEDIUM TO DISPLAY OFF-SCREEN OBJECTS IN SUB-WINDOWS

CROSS-REFERENCE TO RELATED APPLICATION

The present application claims priority of co-pending Japanese patent application 2011-279596, filed on Dec. 21, 2011.

BACKGROUND

The present invention relates to a graphical user interface, and more particularly to an information processing apparatus, a display processing method, and a program, which improve usability when handling a large number of objects on a display screen.

Many current personal computers employ a window system, which enables intuitive operation. The window system allows a user to access a desired object not displayed in a window by scrolling with an input device, such as a mouse or a keyboard.

Since data such as a large amount of content, a large table, or a large document cannot be displayed as a whole within a window, such data is typically browsed with scrolling or tab-switching. In working on a plurality of scattered objects, operations for finding desired objects are required because not all the objects can necessarily be simultaneously displayed.

Common ways to simultaneously display a plurality of objects include activating two or more instances of an application, or dividing a screen into two or more areas and displaying different portions of the same document.

Japanese Patent Application JP2004-145724A, "Information Display Method for Information Display", discloses a technique for such a situation that past headlines of e.g., news, in a headline list displayed on a screen, are scrolled up and out of the screen over time. Designating headlines that will be needed (that are desired to be browsed later) in advance allows past headlines scrolled out of the screen to be displayed in a sub-window.

Japanese Patent Application JP02-139625A, "Screen Display System", discloses a technique by which, when data larger than a screen is displayed, information is displayed indicating the presence of a portion not displayed in the screen. Specifically, for any portion not displayed in the screen, a boundary of a data display area is represented as a dotted line instead of a solid line.

According to the above-mentioned Japanese Patent Applications, when there is a portion that extends off screen due to scrolling etc., the presence and information thereof are displayed. However, it does not provide an ergonomically excellent display/selection method when a particular region is out of a display area. Moreover, when the particular region returns into the display area with scrolling etc., the display of the presence information is not appropriately cleared.

BRIEF SUMMARY

The present invention has been made in view of the above described problems, and it is an object to provide an information processing apparatus, a display processing method, and a program, which appropriately display or hide information to which the user wants to refer. It is another object of the present invention to provide a work environment for working on a plurality of objects while referring to regions and objects on which the user put a mark. It is a further object of the present invention to provide an environment in which the user is not provided with a duplicate display of information. It is a further object of the present invention to provide a work environment for manipulating a plurality of objects while giving a sweeping view of relevant objects. To solve the above-described problems in the conventional art, the present invention enables necessary information present outside a display area to be simultaneously displayed in a sub-window around the display area. More specifically, in response to a user marking any one or more positions in a current window, objects in the marked region and their related objects are all selected to set a marked region. When the marked region becomes outside the display area for some reason such as scrolling, the marked region is displayed in a sub-window. In contrast, when the marked region becomes inside the display area, the sub-window disappears. The sub-window is displayed along with, and therefore can be compared with, the currently operated window. At this point, the sub-window is placed outside the current window or at a position not overlapping objects in the current window.

BRIEF DESCRIPTION OF THE SEVERAL VIEWS OF THE DRAWINGS

FIG. 21 shows a structure of a marking information database; and

FIG. 22 shows a structure of an object-related information database.

DETAILED DESCRIPTION

Figure 1:
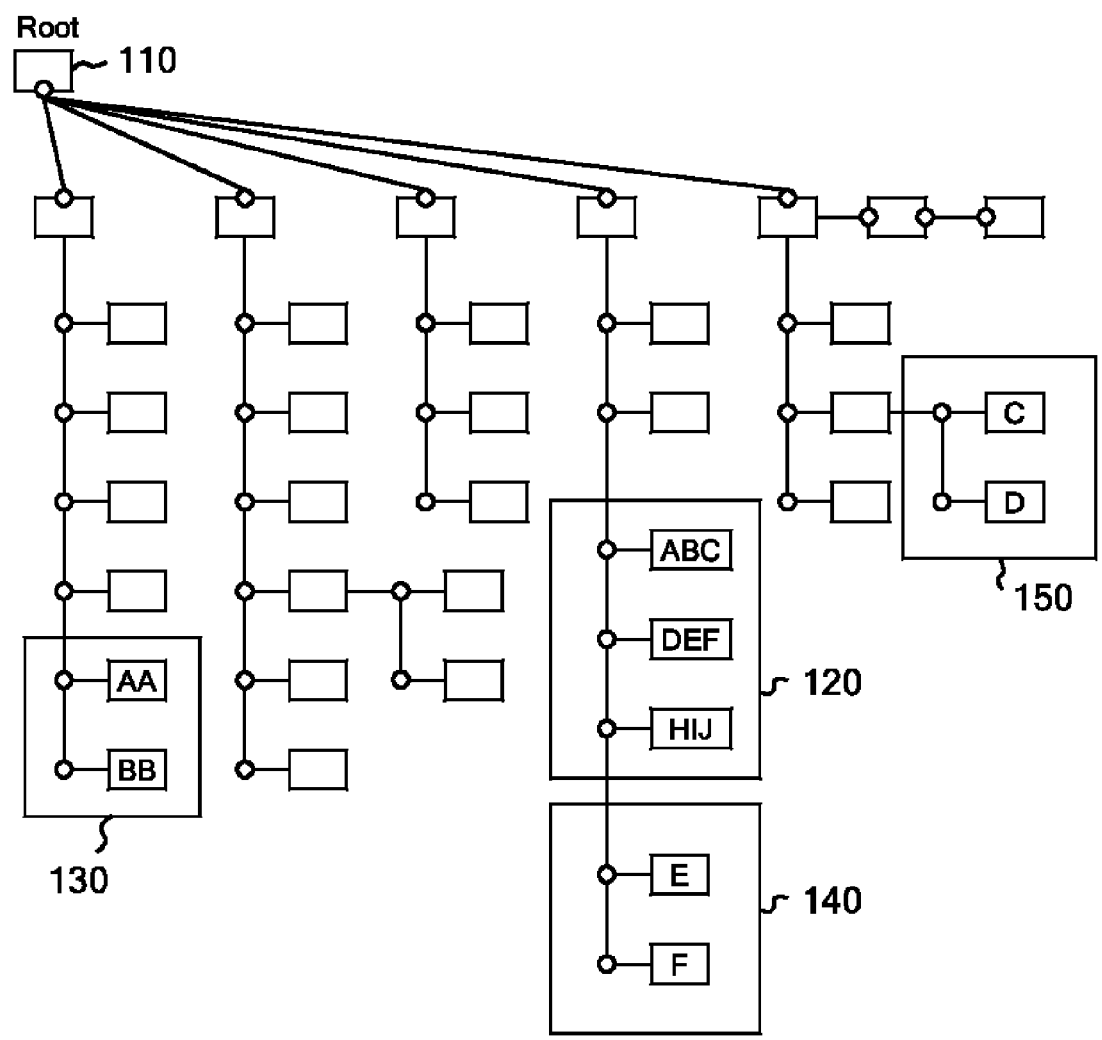
FIG. 1 shows an object node tree that includes nodes and branches.

While the present invention will be described below with reference to an embodiment, the present invention is not limited to the embodiment to be described below.

As stated briefly above, the present invention enables necessary information present outside a display area to be simultaneously displayed in a sub-window around the display area. More specifically, in response to a user marking any one or more positions in a current window, objects in the marked region and their related objects are all selected to set a marked region. When the marked region becomes outside the display area for some reason such as scrolling, the marked region is displayed in a sub-window. In contrast, when the marked region becomes inside the display area, the sub-window disappears. The sub-window is displayed along with, and therefore can be compared with, the currently operated window. At this point, the sub-window is placed outside the current window or at a position not overlapping objects in the current window.

The present invention also allows a plurality of marks, where the marked regions are displayed in respective sub-windows. A sub-window is placed to maintain a positional relationship with the current window indicating in which direction the marked region is present relative to the current window.

As a different implementation, a sub-window may always be placed near a mouse cursor. Further, selecting the inside of a sub-window allows the sub-window to be displayed as the current window. If this causes a marked region to become outside the display area, the marked region is now displayed as a sub-window.

When the mouse cursor is moved outside the current window, a plurality of sub-windows may be placed inside the current window with objects overlapping each other so that the sub-windows become within the current window.

The present invention provides an information processing apparatus having the following characteristics. The information processing apparatus has software running thereon, the software having a window as a user interface for displaying a plurality of objects on a display apparatus, the information processing apparatus performing: in response to a user selecting a desired region in a display region of the display apparatus, putting a mark on the region and an object which is present in the region; when the object of the marked region is not displayed in the window, displaying the object in the marked region in a periphery of the window as a sub-window; and closing the sub-window in response to the object in the marked region being displayed in the window.

Here, the information processing apparatus performs, in response to the user selecting any of objects in the sub-window, displaying, in the window, the marked region containing the objects displayed in the sub-window, and deleting the sub-window.

Further, in the information processing apparatus, a transfer button is provided in the sub-window, the information processing apparatus performing, in response to the user selecting the transfer button, displaying, in the window, the marked region displayed in the sub-window, and deleting the sub-window.

Further, the information processing apparatus performs: searching for objects related to the objects displayed in the window; and displaying, as a sub-window, related objects found by searching and not displayed in the window.

In the information processing apparatus, displaying the sub-window includes displaying the sub-window so that a direction in which the marked region displayed in the sub-window is present relative to the window is indicated.

In another implementation, the present invention may be provided as a method, a computer program causing a computer to perform the method, or as a recording medium having stored therein a computer program in a computer-readable form.

The above configuration can provide a technique by which, when the marked region is outside the display area, information about the marked area is displayed at an appropriate position, and when the marked region returns to the inside of the display area due to scrolling etc., the sub-window is seamlessly cleared.

Turning now to the figures, with reference to FIGS. 1 to 22, an information processing apparatus in accordance with an embodiment of the present invention will be described below. In the embodiment to be described below, a computer apparatus having software running thereon for displaying, selecting, and manipulating objects will be described as an example of an information processing apparatus having software running thereon that includes, as a user interface, a display screen on which a plurality of objects are placed. Exemplary objects include icons, document files, images, image files, video files, and audio files.

Operational implementations of the present invention will be described using FIGS. 1 to 17. FIG. 1 shows a node tree that includes nodes and branches. Since the node tree 110 is very large and wide, the entire node tree 110 cannot be displayed in a display region of a display apparatus.

The node tree 110 is digital data typically stored in a memory space in a computer, and a plurality of objects originating in Root are linked by nodes and branches. Examples of such node trees are quite commonly used in version management for source code, parts management for industrial products, circuit design, operation schedules, schedule management, and the like. A user performs desired operation by causing these nodes, branches, and objects to be displayed and manipulating them.

In FIG. 1, a region 120 is a region currently viewed by the user. Marked regions 130, 140, and 150 are assumed to be regions already marked by the user. Generally, the region 120 alone does not provide sufficient information for the user to perform operation, so that the user performs operation on the node tree while referring to the marked regions 130, 140, and 150 as necessary. A marked region is a region designated in advance by the user as information the user wants to refer to for the user's operation. Conventionally, each time the user wants to refer to information, the user must move the current region to where the information is present with a mouse cursor or the like.

Figure 2:
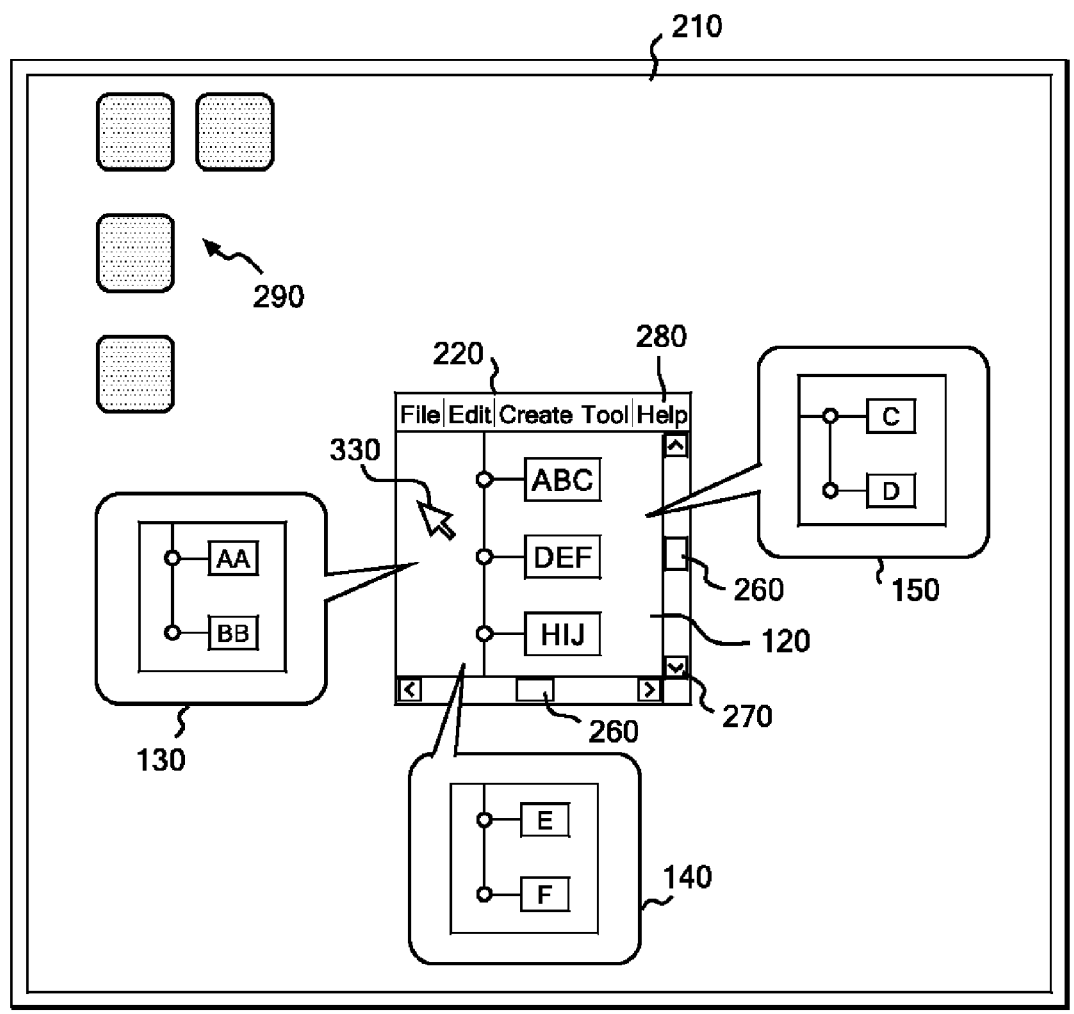
FIG. 2 shows an example of a screen illustrating an implementation of the present invention.

FIG. 2 shows an exemplary screen for understanding of an implementation of the present invention. A display region 210 on the display apparatus is a desktop screen displayed by an operating system. The display region 210 displays various icons 290 for use by the user, and a window 220 of an application for working on a plurality of objects.

The application is not a special one but is similar to software for file object management, such as Microsoft® Explorer or File Manager of Microsoft Windows®, or Finder® of Mac®. Further, the application may be implemented in the form of add-on software added on to an Internet browser such as Microsoft Internet Explorer®. ("Microsoft", "Windows", and "Internet Explorer" are registered trademarks of Microsoft Corporation in the United States, other countries, or both. "Mac" is a registered trademark of Apple Inc., in the United States, other countries, or both.)

The application window 220 includes a display region 120 in which objects are displayed, a menu bar 280 for manipulating objects and managing files, and a scroll bar 260 and a slide button 270 for shifting the current region. A pointer 330 for operating each of GUI parts and buttons is also displayed.

A plurality of sub-windows, which represent a feature of the present invention, are displayed around the application window 220. The marked regions 130 to 150 marked in advance by the user are displayed in the sub-windows.

The user selects a desired region in the display region on the display apparatus in advance, and marks the selected region and objects present in the selected region. In response to the objects in the marked region being not displayed in the window, the objects in the marked region are displayed in a sub-window around the window.

Further, in response to the objects in the marked region being displayed in the window, the sub-window is closed.

For a marked region, objects contained in the marked region are recorded. FIG. 21 shows a structure of a database for managing marking information. The database, which is for managing marked regions, records mark numbers and a set of objects contained in the region corresponding to each mark number.

For the mark number 1, rectangle position information (a start point and an end point) is written as region information, and objects contained in the region are recorded next to the region information. Alternatively, the region information may be logical relationship information, such as the range of node numbers or branch numbers, for example nodes 5 to 8. The marking information is editable as necessary by the user with a GUI.

In this manner, the marked regions are automatically displayed as respective sub-windows around the main window. Each sub-window is displayed to allow the user to know in which direction the corresponding marked region is present relative to the current main window.

As another implementation, object-related information may be used to automatically set the marked regions. Objects related to an object ABC in FIG. 1 are determined with reference to an object-related information database, and the marked regions 130, 140, and 150 are automatically set.

FIG. 22 shows a structure of the object-related information database. In FIG. 22, the database defines that objects related to the object ABC are an object AA, an object BB, and an object C, and objects related to an object DEF are an object D, an object E, and an object F.

In this manner, objects related to objects in the main window are displayed in sub-windows around the main window.

Preferably, the number of marked regions is reduced by grouping objects located close to each other into one group. For example, among all objects related to objects displayed in the main window, objects located close to each other (or logically close to each other) are grouped together.

In the example of FIG. 1, the objects AA and BB are close to each other and therefore grouped into a first group. Similarly, the objects E and F are grouped into a second group, and the objects C and D are grouped into a third group.

The content of the object-related information database is editable by the user. The user uses a GUI to designate objects and associate the objects with each other.

Figure 3:
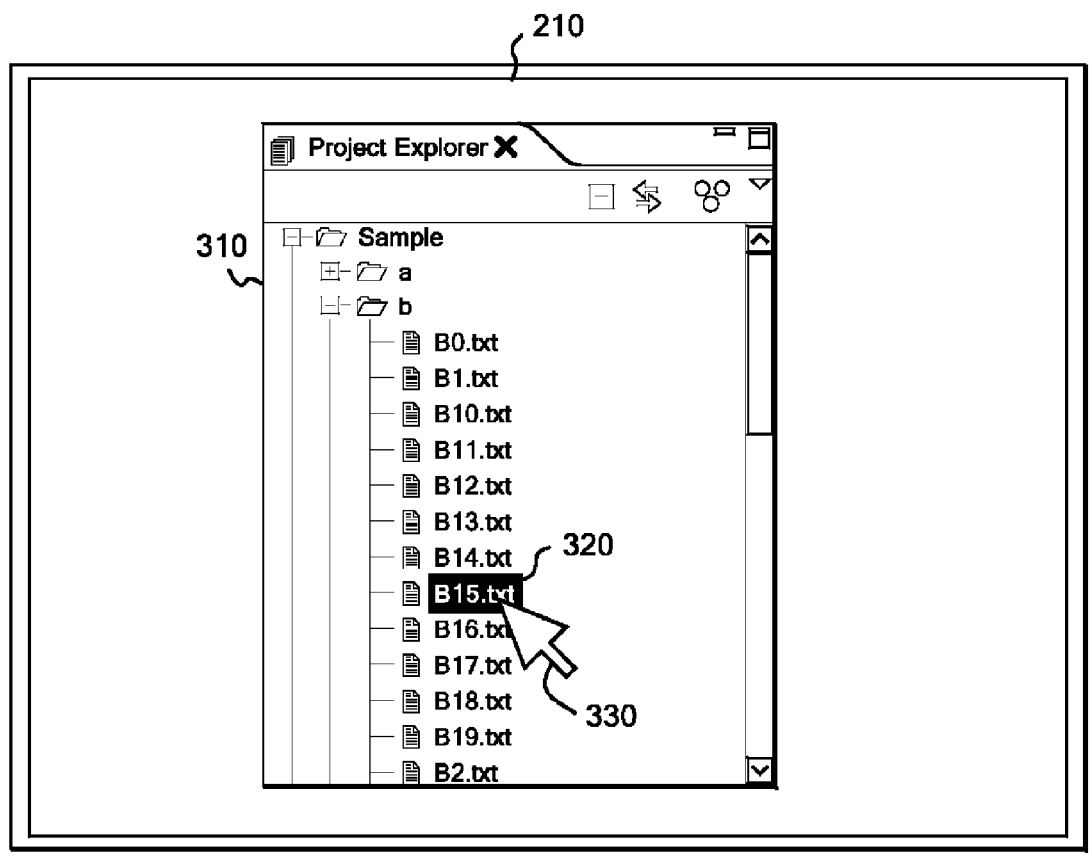
FIGS. 3-16 show detailed examples of a screen illustrating the implementation of the present invention.

Features of the present invention will be described in further detail. FIG. 3 shows an object tree in an application window 310 displayed in the display region 210. In the example of FIG. 3, the objects are text file objects.

A folder having a root "Sample" includes a folder "a" and a folder "b", and the content of the folder b is currently listed. The user is selecting "B15.txt," which is an object 320, with the pointer 330.

Figure 4:
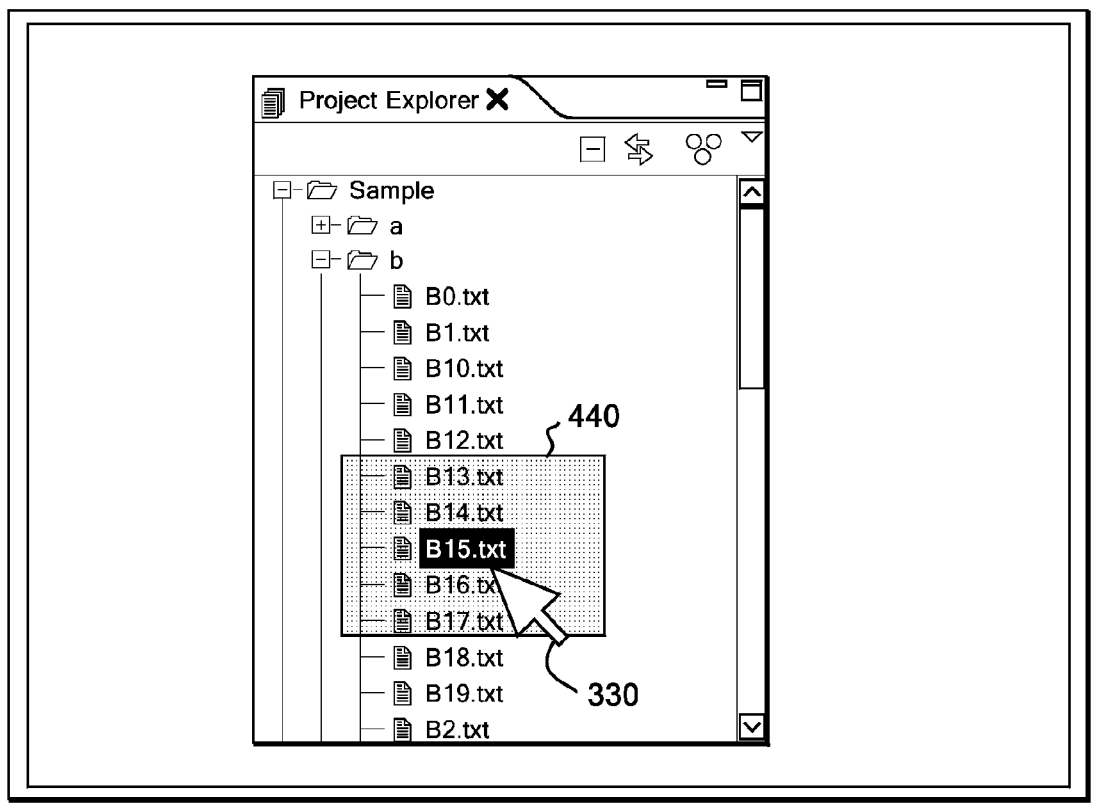

In FIG. 4, the user marks a region 440 with the pointer 330, a keyboard cursor, or the like. The marking operation may involve expanding the region by dragging the mouse cursor from the start point to the end point of the rectangular region while pressing the right mouse button, or designating the region with a particular combination of cursor keys or with a combination of mouse cursors and various keyboard keys. Of course, the region may be designated with a speech recognition technique.

When the user marks the region in FIG. 4, objects contained in the marked region are set as marked. In marking, objects related to the marked objects may also be marked. In this case, the related objects are registered as related objects for the marked region.

As a different implementation, object-related information including preset object-to-object relationships may be used to automatically set a marked region. In this case, if there is an object related to an object displayed in the main window, a marked region is automatically set and the object is displayed in a sub-window.

Figure 5:
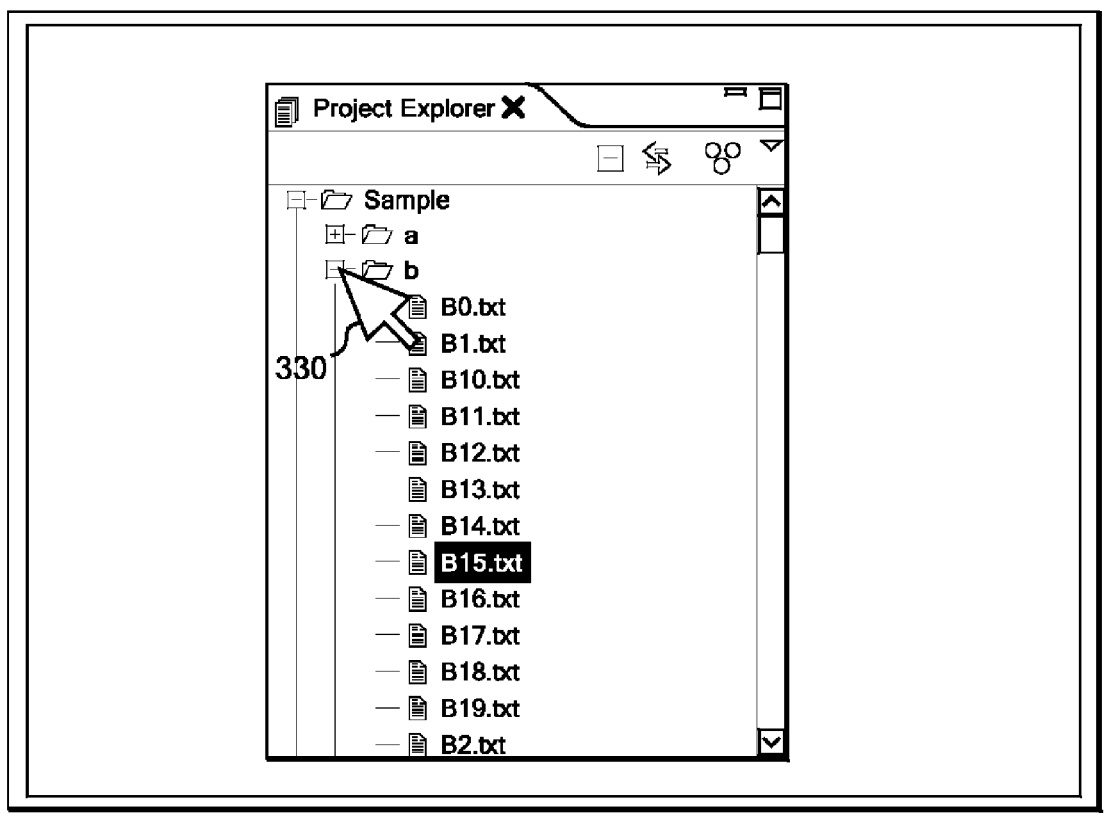
Figure 6:
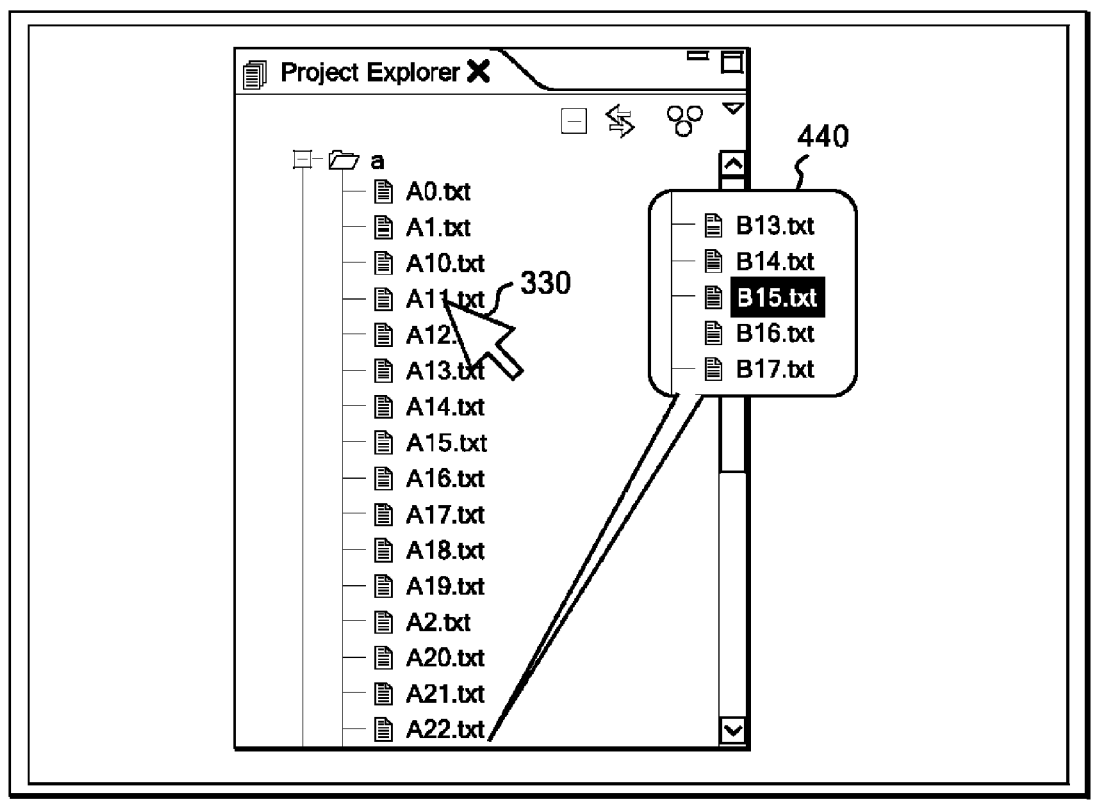

In FIG. 5, the pointer 330 is moved onto the folder a to click thereon. This causes the folder a to be opened, as shown in FIG. 6. As will be understood in FIG. 6, upon moving the pointer 330 onto the folder a to click thereon, a sub-window 440, which is a feature of the present invention, is automatically displayed. In the sub-window 440, the marked region previously marked is displayed. From the position of the tail of the balloon, it can be known in which direction the marked region is located.

Figure 7:
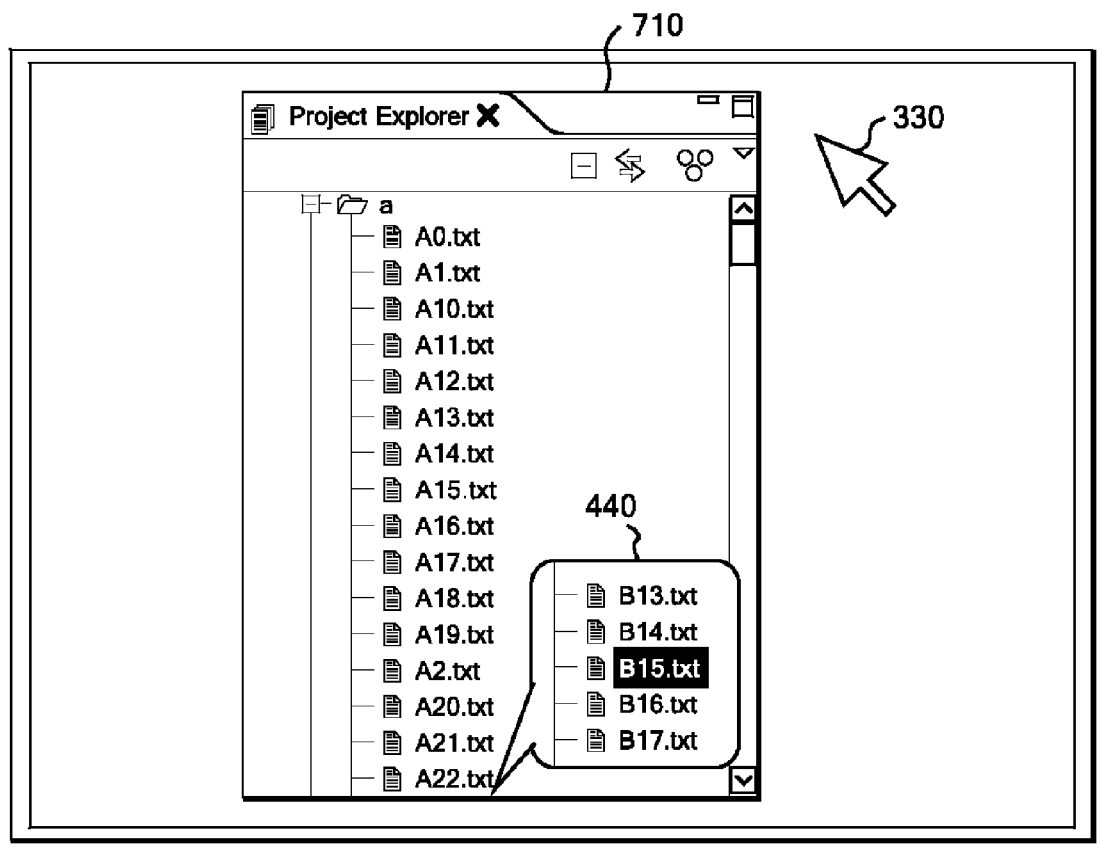

FIG. 7 shows an example in which the pointer 330 in FIG. 6 is moved outside the application window. As will be understood in FIG. 7, the sub-window 440 is automatically moved to be within a main window 710, and position information is also presented indicating in which direction the marked region is present.

Figure 8:
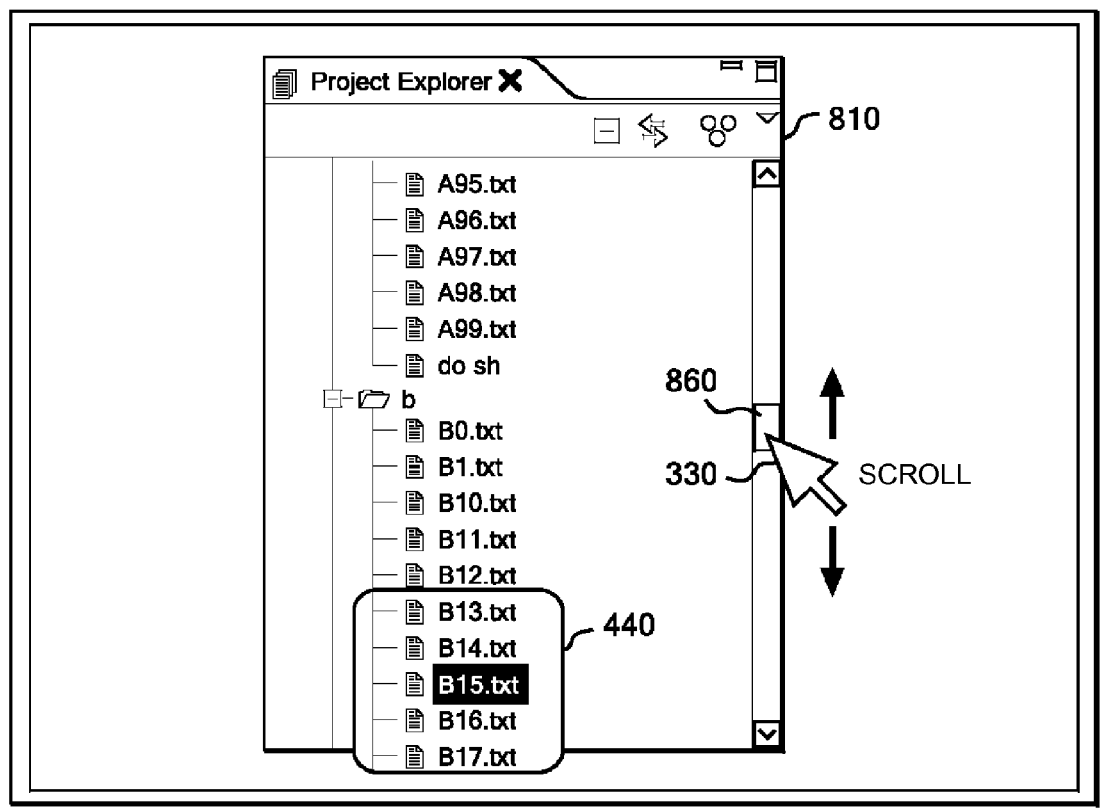

FIG. 8 shows an example in which the pointer 330 is used to perform scrolling. In FIG. 8, as a scroll bar 860 provided in an application window 810 is scrolled down with the pointer 330 toward the bottom of the screen, the marked region is gradually displayed in the main window. The position of the sub-window 440 is adjusted to overlap a corresponding portion of the marked region.

Figure 9:
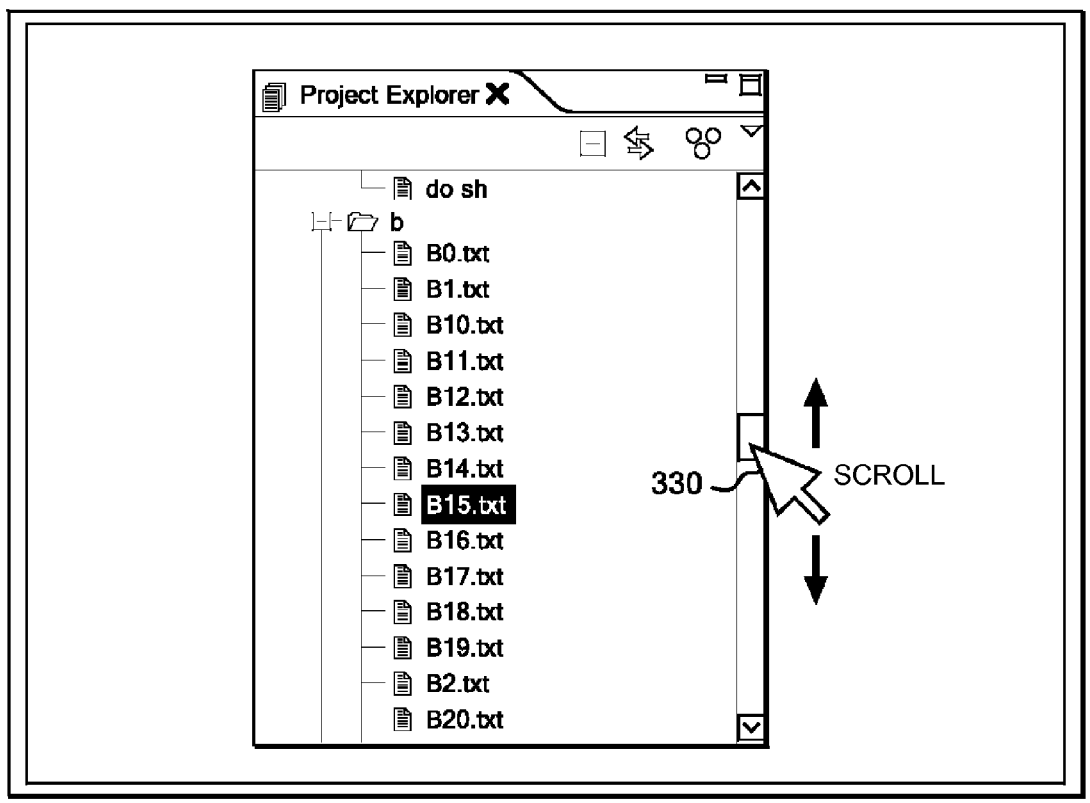

FIG. 9 shows that the screen is further scrolled down with the pointer 330. Here, a feature of the present invention can be seen. In response to the marked region in the sub-window becoming within the main window, the display of the sub-window disappears. In this manner, seamless information display is possible while redundant information is instantaneously cleared.

Figure 10:
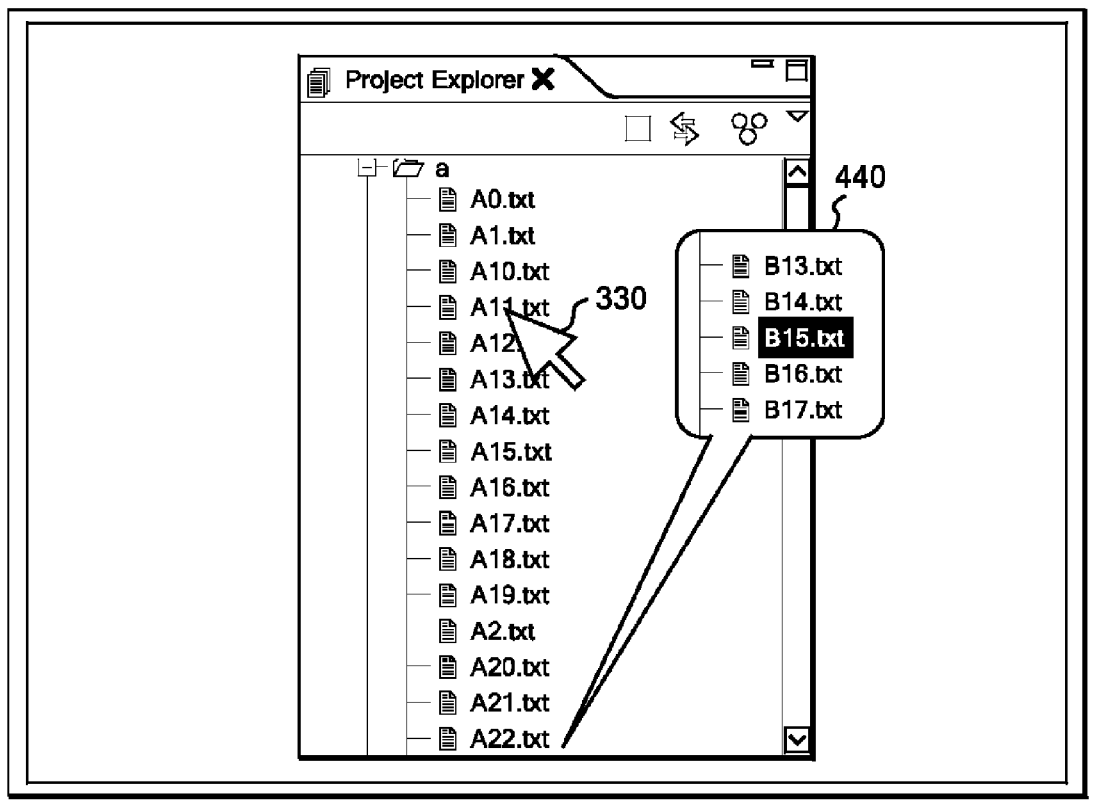

FIG. 10 shows an example in which the display region is again scrolled up with the scroll bar or the like. The sub-window 440 that has disappeared is again displayed.

Figure 11:
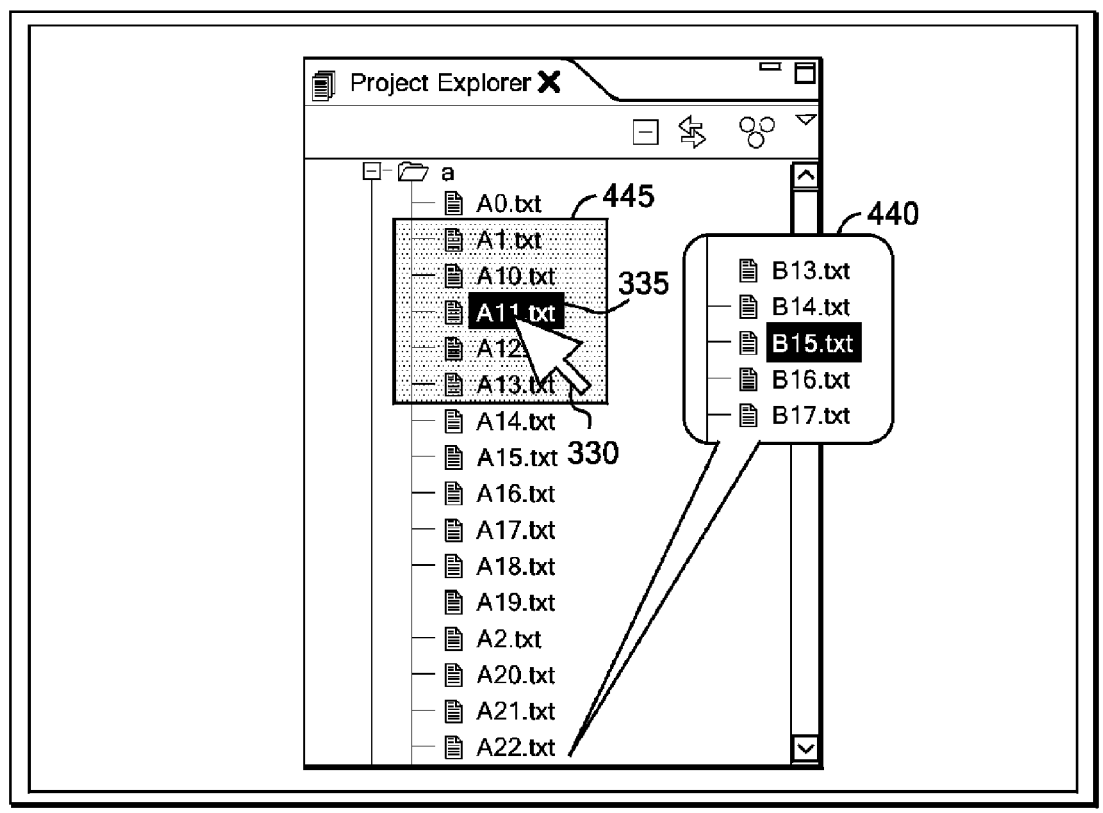

FIG. 11 shows an example in which another marked region is set in the state of FIG. 10. In FIG. 11, the pointer 330 is used to select a text file object 335, and then another region is marked to set a marked region 445. As a result, two marked regions are currently present.

Figure 12:
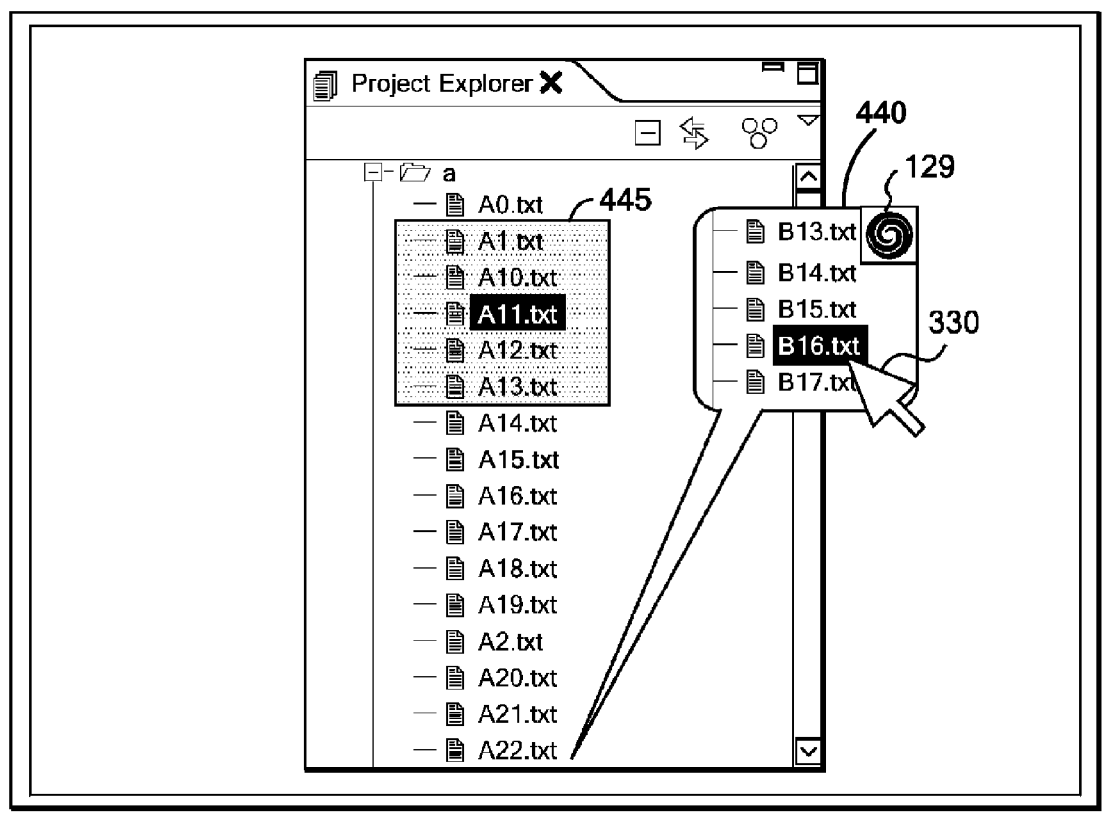

FIG. 12 shows an example in which the pointer 330 is moved onto the sub-window 440 in the state of FIG. 11. Upon the pointer 330 entering the sub-window 440, a warp button 129 (transfer button) is displayed. The warp button is a button for setting the current sub-window as the main window.

Figure 13:
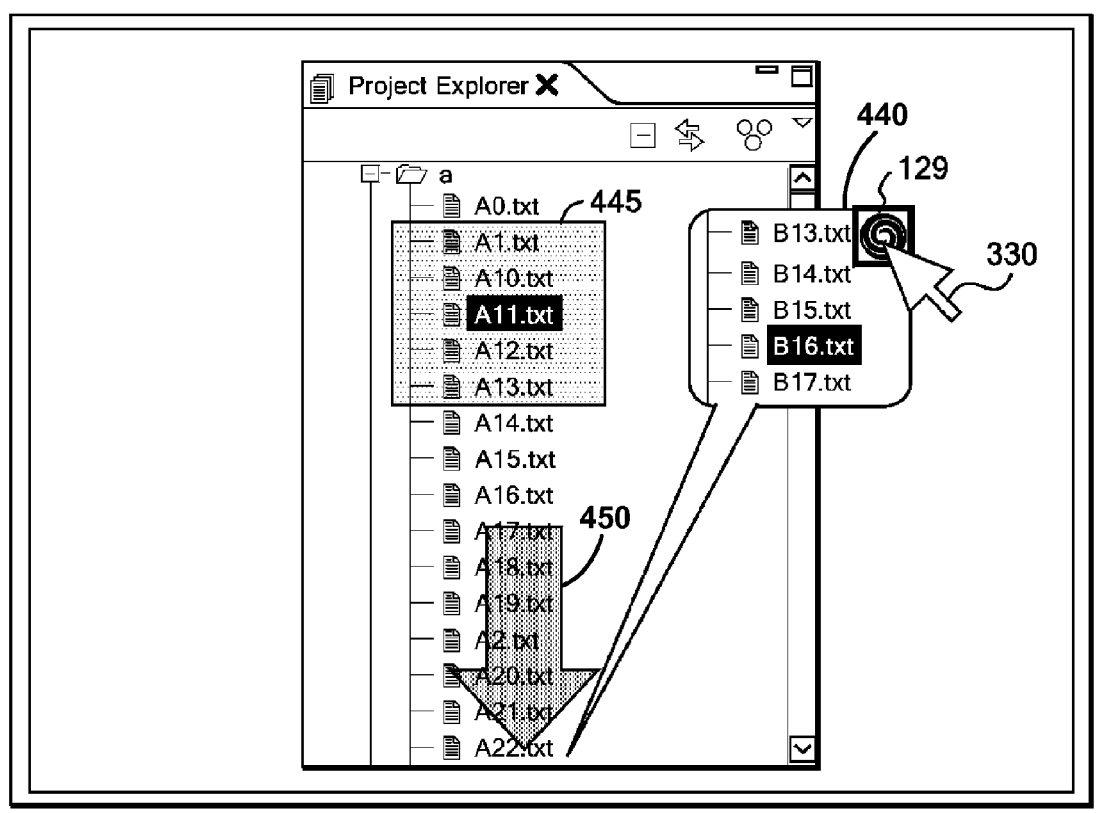

FIG. 13 shows that, after a text file object "B16.txt" is selected with the pointer 330 in FIG. 12, the pointer 330 is moved to click on the warp button 129. Clicking on the warp button 129 in FIG. 13 causes the screen to be automatically scrolled down, resulting in display as in FIG. 14. Preferably, when the mouse pointer 330 is placed onto the warp button 129, an overlay arrow 450 representing the downward movement is displayed.

Figure 14:
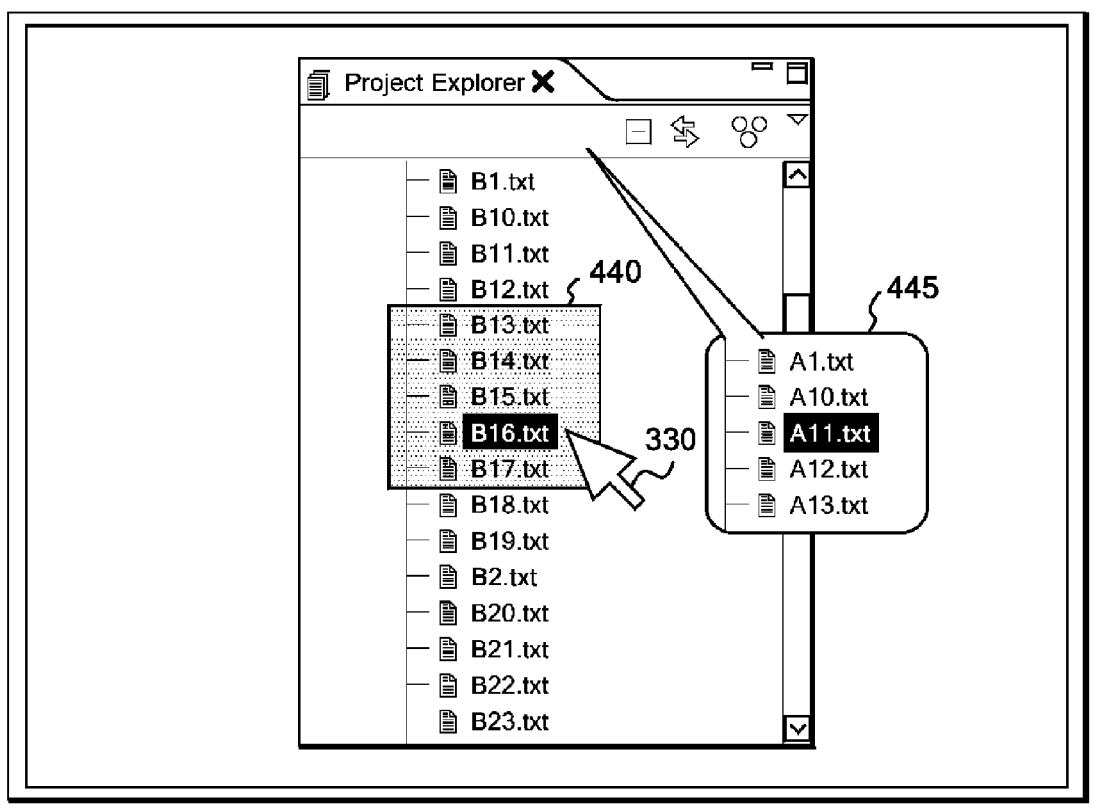

As will be understood in FIG. 14, the selected text file object "B16.txt" is displayed at the center of the main window. At the same time, the second marked region 445 is displayed as a sub-window.

Figure 15:
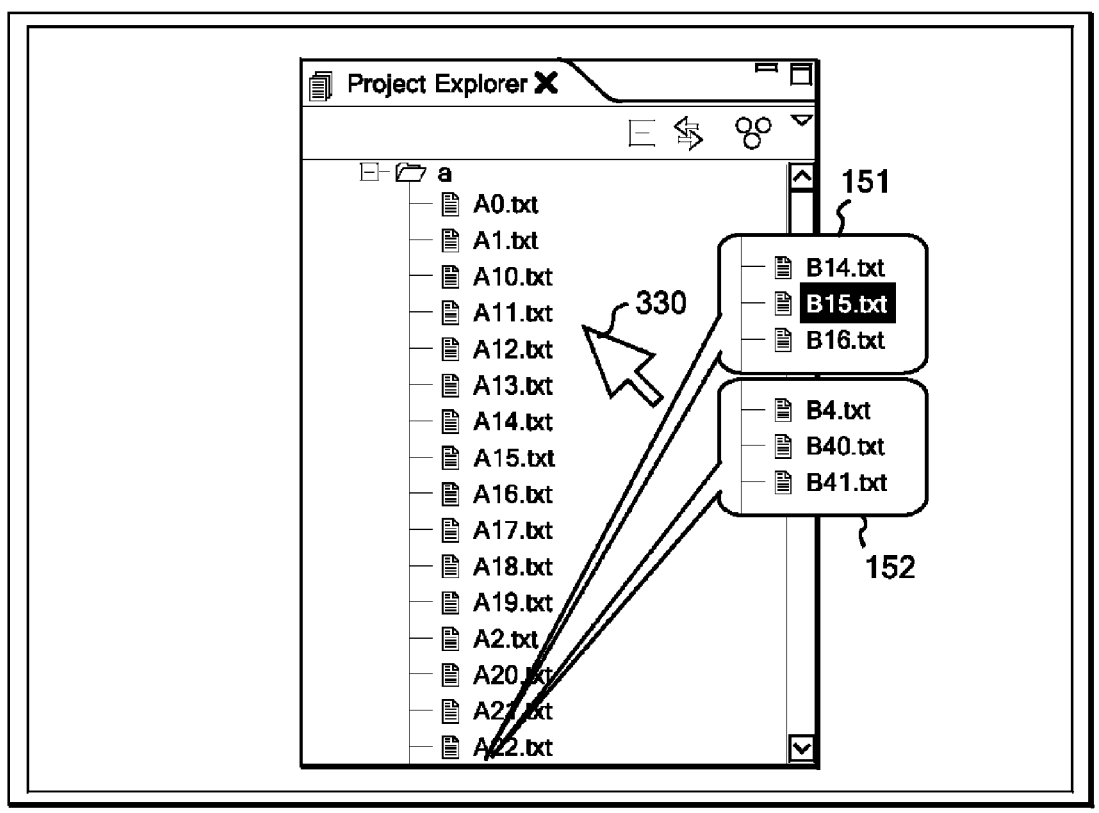
Figure 16:
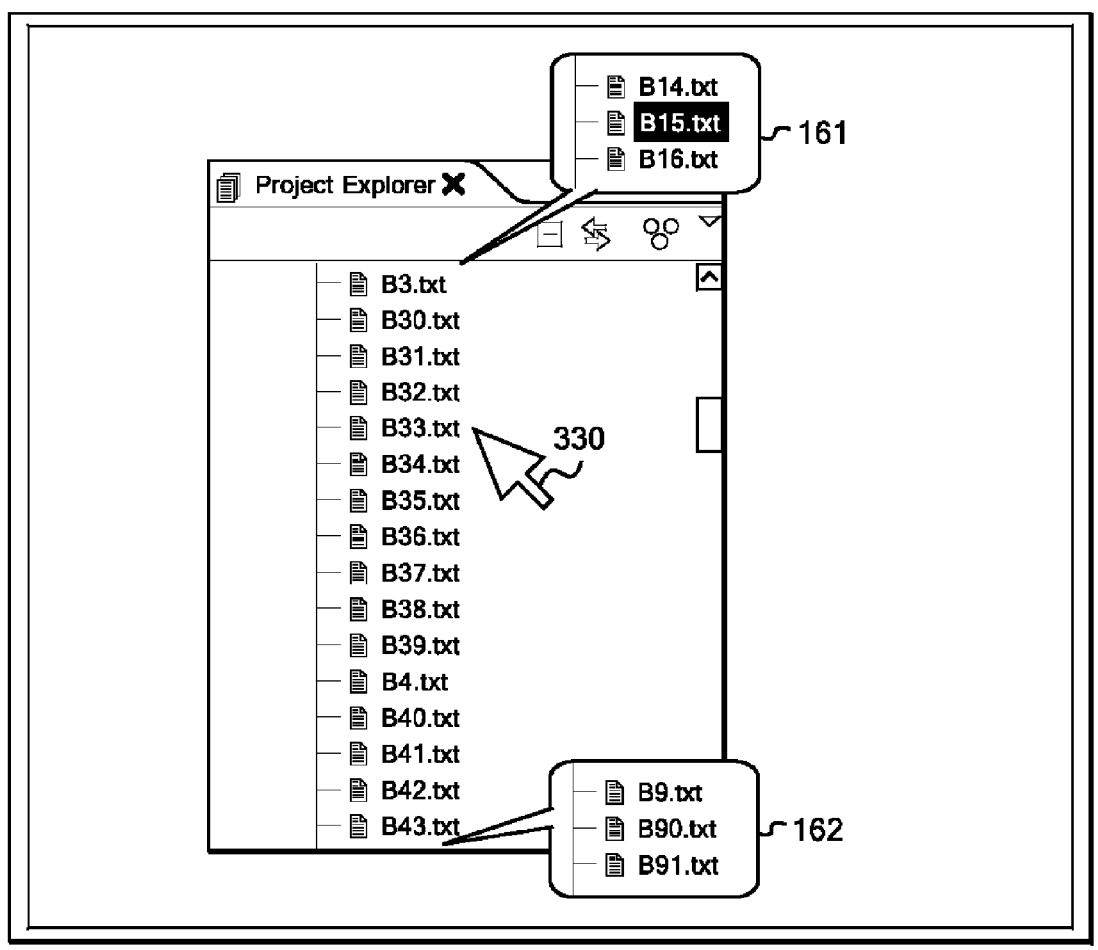

FIG. 15 shows an implementation of display in which a plurality of marked regions 151 and 152 are present below the main window. In this example, each marked region is placed near the pointer 330. Similarly, FIG. 16 shows an exemplary display in which two marked regions 161 and 162 are present above and below the main window, respectively. In this example, each marked region is placed at a position that intuitively represents the positional relationship with the main window.

Figure 17:
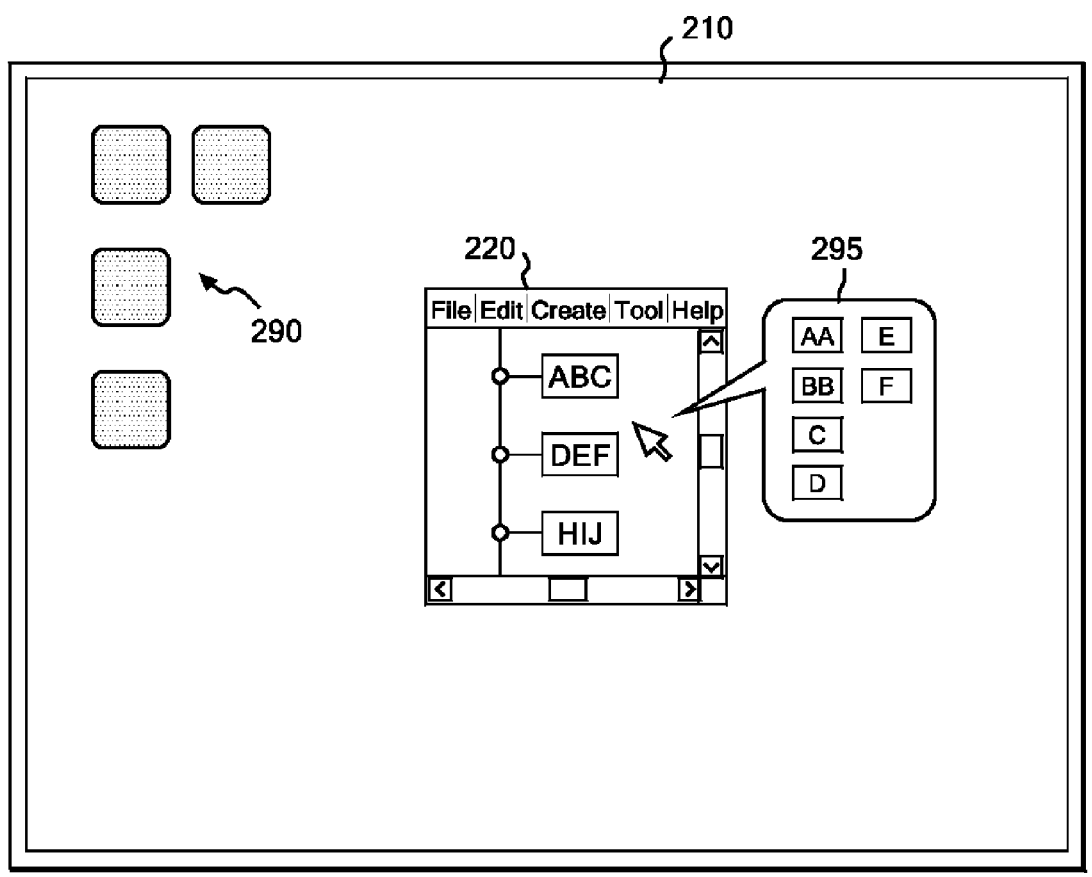
FIG. 17 shows an example of a screen illustrating another implementation of the present invention.

FIG. 17 shows another implementation of the embodiment of the present invention. The objects related to the objects displayed in the main window of the application window 220 are grouped together and displayed as related objects in one sub-window 295.

Using the object-related information database in FIG. 22, the objects related to the objects contained in the currently viewed main window are displayed as one related group in the sub-window 295 around the main window.

In the example in FIG. 22, the objects AA, BB, E, F, C, and D, which are objects related to the main window, are recognized as one group and displayed in the sub-window 295 (related-object display mode).

It is to be noted that, in this implementation, the objects displayed in the sub-window 295 are automatically added or deleted with changes in the objects displayed in the main window 220.

Figure 18:
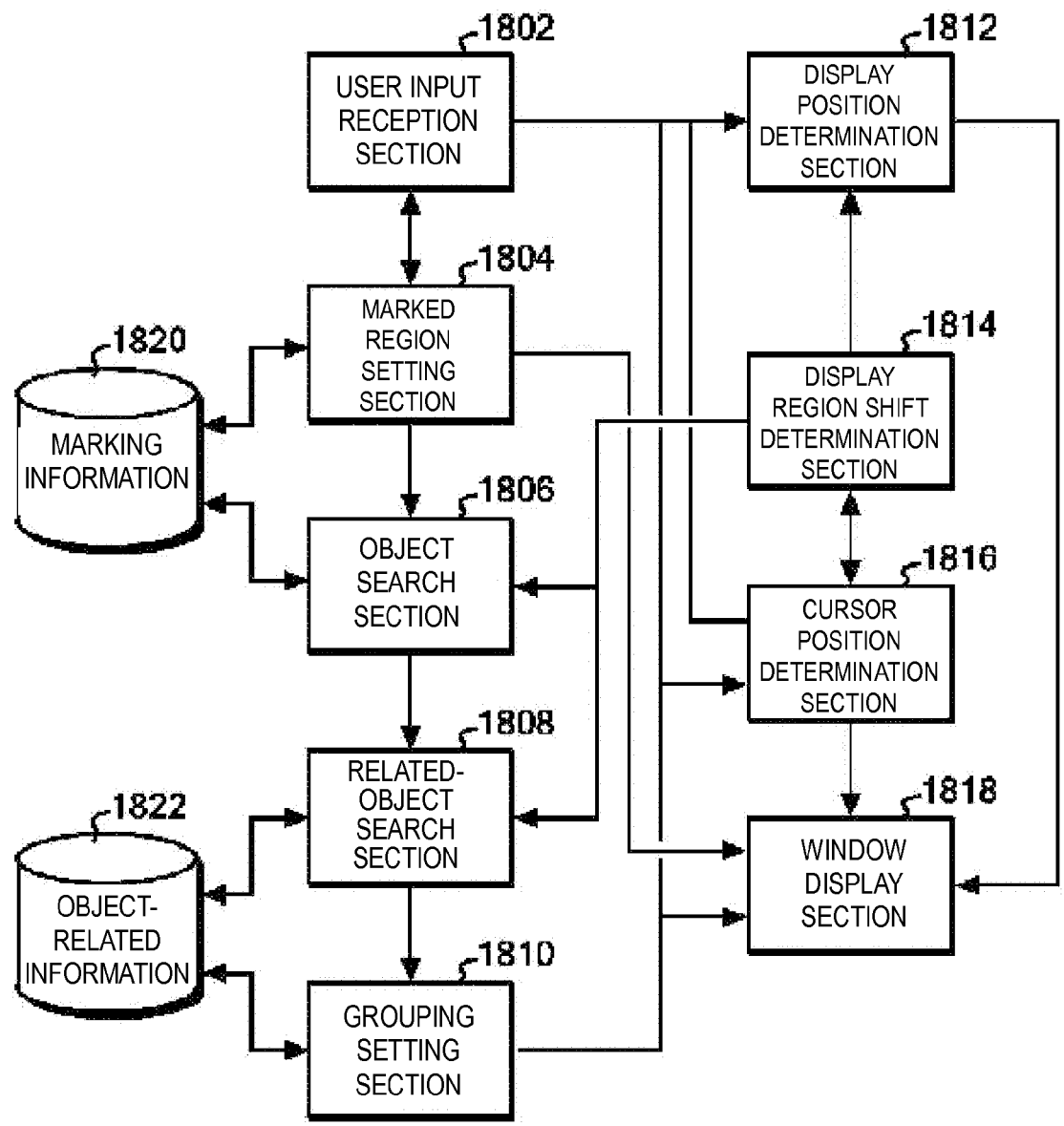
FIG. 18 is a functional block diagram of the present invention.

FIG. 18 shows functional blocks of the information processing apparatus of the present invention. Each functional block may be implemented as dedicated hardware, but is typically configured as a software application that runs on a device such as a personal computer, a PDA (Personal Data Assistant), or a mobile terminal.

A user input reception section 1802 receives the user's pointer operations and keyboard operations to take region designation, object selection, and window manipulation performed through a GUI. A marked region setting section 1804, on receipt of the user's region designation, marks a corresponding region and records the marking information in a marking information database 1820.

An object search section 1806 searches for objects contained in the marked region and records the search result in the marking information database 1820. A related-object search section 1808 refers to an object-related information database 1822 to search for objects related to objects contained in a window viewed by the user, and sends the search result to a grouping setting section 1810.

The grouping setting section 1810 instructs a window display section 1818 to display the related objects found by the search as one group in a sub-window, and also allows edit operations to be performed for the object-related information database 1822 under instructions from the user.

A display position determination section 1812 determines where and how the sub-window is to be displayed, and sends relevant information to the window display section 1818. The display position determination section 1812 also deletes the sub-window if objects contained in the sub-window are contained in the main window.

A cursor position determination section 1816 determines whether the current pointer has been moved based on the user's cursor operation or pointer operation, and if the pointer is moved outside the main window, sends relevant information to the display position determination section 1812. The cursor position determination section 1816 also determines whether the display region has been changed due to scrolling etc., and sends relevant information to a display region shift determination section 1814.

The display region shift determination section 1814 receives the information about pointer movement and region shift from the cursor position determination section 1816. The display region shift determination section 1814 monitors changes in objects in the main window and, for any change, sends relevant information to the related-object search section 1808 correspondingly. If region shift has occurred, the display region shift determination section 1814 sends relevant information to the display position determination section 1812.

The display region shift determination section 1814 also determines whether the warp button has been pressed. If the warp button has been pressed, the display region shift determination section 1814 determines region shift has occurred, thereby setting the current sub-window as the main window and sending relevant information to the object search section 1806.

The window display section 1818 displays the sub-window at a designated position based on signals from the grouping setting section 1810, the display position determination section 1812, and the cursor position determination section 1816.

Figure 19:
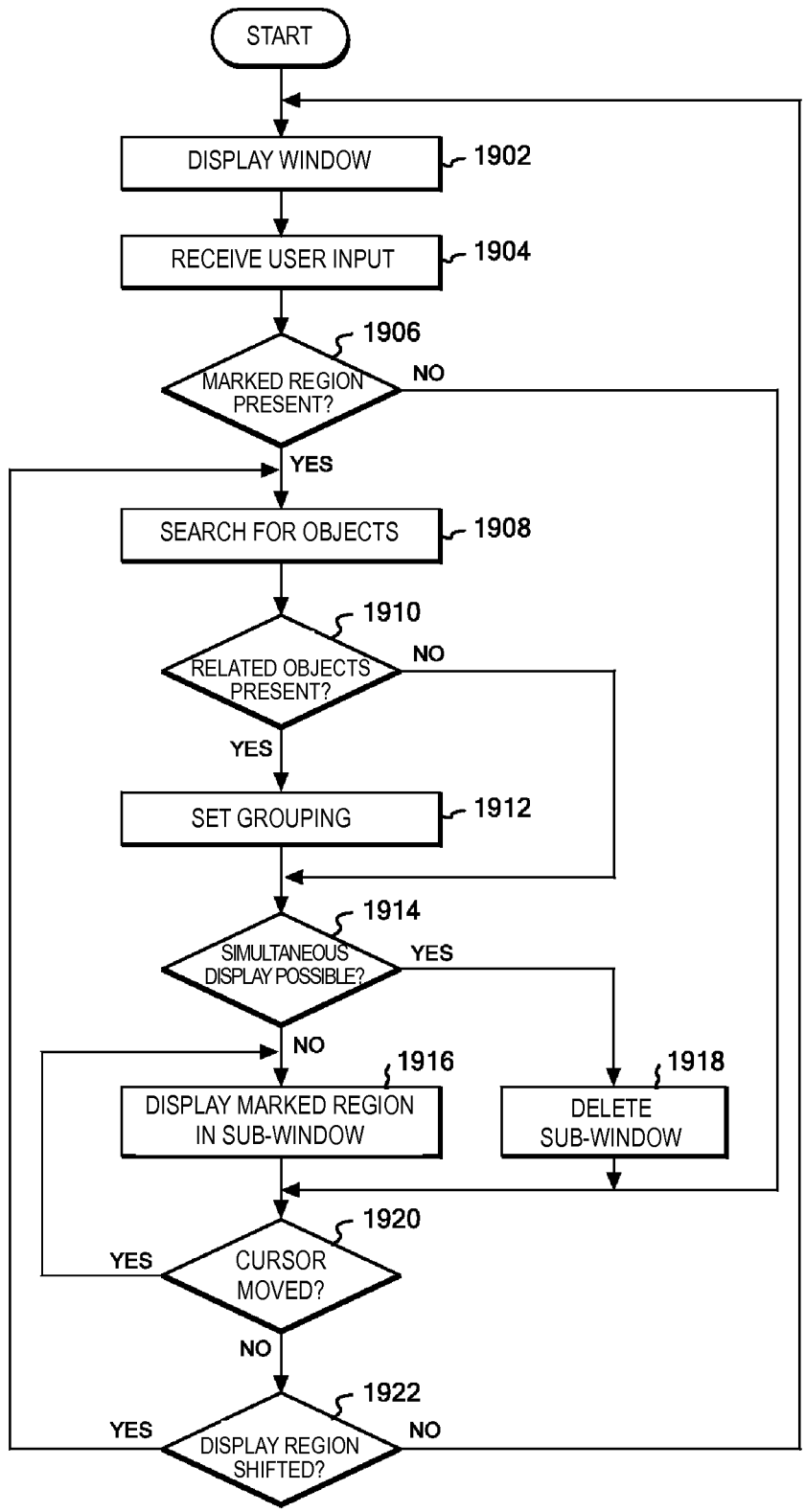
FIG. 19 is a process flowchart of the present invention.

FIG. 19 shows a flowchart of sub-window display of the present invention. In step 1902, a main window is displayed. Next, in step 1904, a user input is received.

In step 1906, it is determined whether a user-designated marked region is present. If no marked region is present, the process moves to step 1920. If a marked region is present, objects contained in the main window are searched for in step 1908.

For each object found by the search, it is determined at step 1910 whether related objects are present with reference to the object-related information database 1822. If no related objects are present, the process proceeds to step 1914.

If related objects are present, the objects are grouped together in step 1912. Next, in step 1914, it is determined whether objects in the marked region or the objects grouped together are all contained (displayed) in the main window.

If all the objects are contained, an existing sub-window is deleted in step 1918, and the process proceeds to step 1920. If not all the objects are contained, the corresponding marked region or group of objects is displayed in a sub-window in step 1916.

In step 1920, it is determined whether a user has moved a cursor or pointer. If the user has moved the cursor or pointer, the process returns to step 1916 for adjusting the position of the sub-window and again displays the sub-window. If the user has not moved the cursor or pointer, the process proceeds to step 1922.

In step 1922, it is determined whether the display region has been shifted. If the display region has been shifted, the process returns to step 1908 and again searches for objects. If the display region has not been shifted, the process returns to step 1902.

In step 1922, selection of the warp button is also deemed as shift of the display region. If the warp button is pressed, the sub-window is set as the main window to search for objects again in step 1908.

Thus, as described above, in accordance with the embodiment, information necessary for working on many objects displayed in a window is displayed in a sub-window. The sub-window is automatically deleted if redundant information is displayed due to window manipulation.

Objects related to objects in the window can also be displayed in a sub-window. As the objects in the window change, the related objects displayed in the sub-window also change. The present invention thus enables flexible and ergonomically excellent information presentation.

Figure 20:
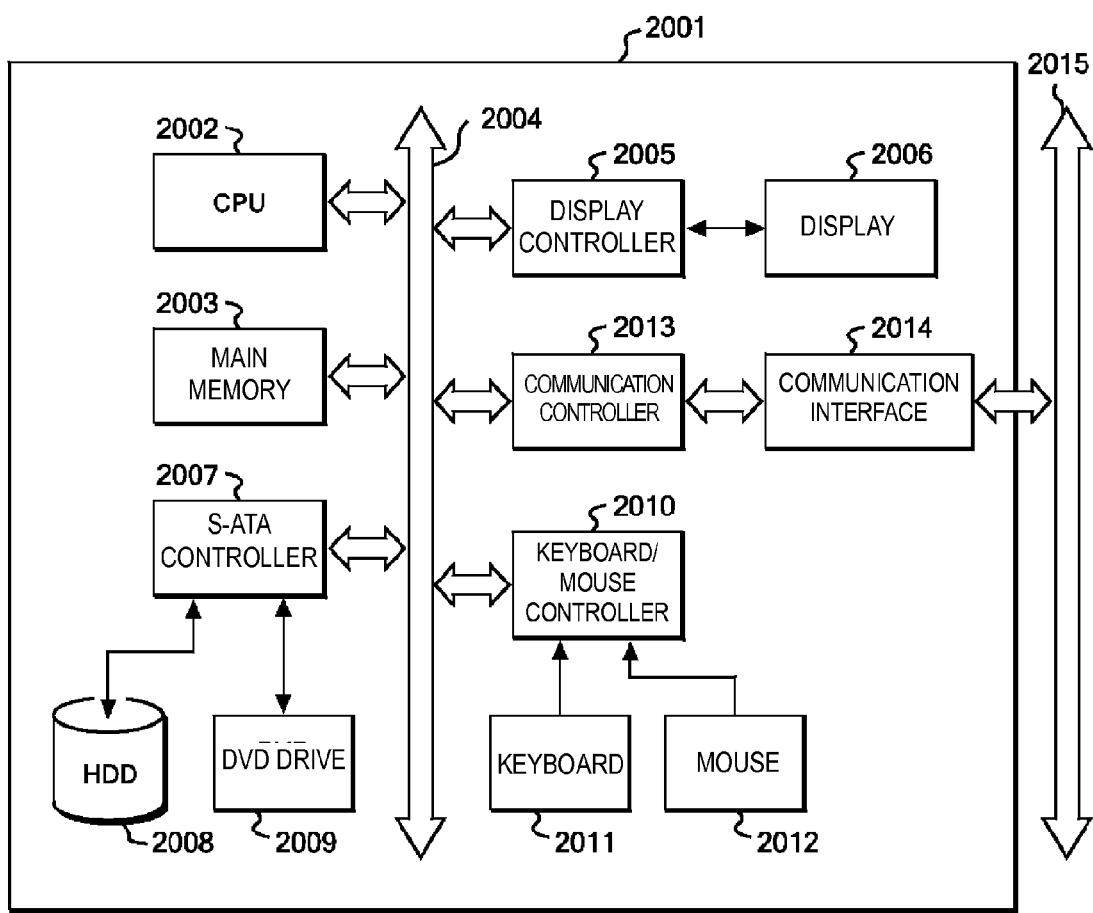
FIG. 20 shows an example of a typical hardware configuration to be used in the present invention.

FIG. 20 shows a block diagram of exemplary computer hardware to be used for window control of the present invention. A computer system 2001 in accordance with the embodiment of the present invention includes a CPU 2002 and a main memory 2003, which are connected to a bus 2004.

The CPU 2002, which is preferably based on a 32-bit or 64-bit architecture, may be implemented as one in the Xeon® series, Intel Core® series, Intel Atom® series, Pentium® series, and Celeron® series of Intel Corporation, or the Phenom™ series, Athlon™ series, Turion™ series, and Sempron™ of Advanced Micro Devices, Inc., for example. ("Xeon", "Intel Core", "Intel Atom", "Pentium", and "Celeron" are registered trademarks of Intel Corporation in the United States, other countries, or both. "Phenom", "Athlon", "Turion", and "Sempron" are trademarks of Advanced Micro Devices, Inc., in the United States, other countries, or both.)

A display 2006 such as an LCD monitor is connected to the bus 2004 via a display controller 2005. The display 2006 is used for displaying applications and a pointer. A hard disk or silicon disk 2008 and a CD-ROM, DVD, or Blu-ray drive 2009 are also connected to the bus 2004 via an IDE or SATA controller 2007.

A program for performing the display processing method of the present invention, a marking information database, an object-related information database, and grouping information are preferably stored in the hard disk 2008 or the main memory 2003 and executed by the CPU 2002 to perform window control.

The CD-ROM, DVD, or Blu-ray drive 2009 is used as necessary for installing the program of the present invention into the hard disk from a CD-ROM, DVD-ROM, or Blu-ray disk, which is a computer-readable medium, or for reading data from such a medium.

A keyboard 2011 and a mouse 2012, which are relevant to the window control of the present invention, are further connected to the bus 2004 via a keyboard/mouse controller 2010 to operate the pointer 330.

A communication interface 2014 conforms to the Ethernet protocol, for example. The communication interface 2014, which is connected to the bus 2004 via a communication controller 2013, is responsible for physically connecting the computer system with a communication line 2015 and provides a network interface layer for the TCP/IP communication protocol of communication functionality of an operating system of the computer system.

Document data containing a plurality of objects, a logically structured file representing nodes and branches, an image object file, etc., may be read via the communication line and processed.

The computer system 2001 has installed therein a GUI-based operating system, such as Windows®, Linux®, or Mac® OS X®. The program or an application for performing the display processing method of the present invention operates under the control of the operating system. ("Linux" is a registered trademark of Linus Torvalds in the United States, other countries, or both. "OS X" is a registered trademark of Apple Inc. in the United States, other countries, or both.)

The program for performing the display processing method of the present invention may be implemented as a machine-executable program written in an object-oriented programming language, such as C++, Java®, JavaBeans®, Java® Applet, JavaScript®, Perl, or Ruby. The program may be distributed in the form stored in a computer-readable recording medium. ("Java", "JavaBeans", and "JavaScript" are registered trademarks of Oracle America, Inc. in the United States, other countries, or both.)

While the present invention has been described with reference to the particular embodiment, the present invention is not limited to the embodiment. Rather, changes conceivable by those skilled in the art may be made to the present invention, including other embodiments, addition, modification, and deletion. Such changes are within the scope of the present invention as long as they provide effects and advantages of the present invention in any implementation.

The invention claimed is:

1. An information processing apparatus having software running thereon, the software having a window as a user interface for displaying a plurality of objects on a display apparatus, the information processing apparatus comprising:
   a computer comprising a processor; and
   a program which is executable, using the processor, to implement functions comprising:
      in response to a user selecting a desired region in the window of the display apparatus, putting a mark on the region and an object which is present in the region;
      changing the window to not display the object in the marked region;
      while the object of the marked region is not displayed in the window, displaying a sub-window in a periphery of the window, the sub-window displaying the object in the marked region, wherein a transfer button is provided in the sub-window automatically, responsive to detecting that the user moved a selection pointer onto the sub-window;
      responsive to detecting that the user moved the selection pointer over the transfer button, overlaying, over at least a portion of current contents of the window, an arrow depicting a direction of movement that will occur for the window if the transfer button is selected; and
      responsive to the user selecting the transfer button, displaying, in the window, the marked region displayed in the sub-window, and deleting the sub-window.

2. The information processing apparatus according to claim 1, wherein the functions further comprise, in response to the user selecting any of at least one object displayed in the sub-window, displaying, in the window, the marked region containing each of the at least one object displayed in the sub-window, and deleting the sub-window.

3. The information processing apparatus according to claim 2, wherein the displaying the marked region in the window comprises causing current contents of the window to shift in order to position the display of the marked region in the window.

4. The information processing apparatus according to claim 1, wherein the functions further comprise:
   searching for objects related to the objects displayed in the window; and
   displaying, as the sub-window, related objects found by searching and not displayed in the window.

5. The information processing apparatus according to claim 1, wherein displaying the sub-window comprises displaying the sub-window so that a direction in which the marked region displayed in the sub-window is present, relative to current contents of the window, is graphically indicated.

6. The information processing apparatus according to claim 1, further comprising:
   detecting that at least one object which was present in the marked region shifts into the window; and
   responsive to the detecting, automatically moving the sub-window from the periphery to an overlay position on the window, the overlay position corresponding to a position that aligns each of the detected at least one object in the marked region over a position of the each detected object within the window.

7. A method for displaying a sub-window in an information processing apparatus having software running thereon, the software having a window as a user interface for displaying a plurality of objects on a display apparatus, the method comprising:
   in response to a user selecting a desired region in the window of the display apparatus, putting a mark on the region and an object which is present in the region;
   changing the window to not display the object in the marked region;
   while the object of the marked region is not displayed in the window, displaying a sub-window in a periphery of the window, the sub-window displaying the object in the marked region, wherein a transfer button is provided in the sub-window automatically, responsive to detecting that the user moved a selection pointer onto the sub-window;
   responsive to detecting that the user moved the selection pointer over the transfer button, overlaying, over at least a portion of current contents of the window, an arrow depicting a direction of movement that will occur for the window if the transfer button is selected; and responsive to the user selecting the transfer button, displaying, in the window, the marked region displayed in the sub-window, and deleting the sub-window.

8. The method according to claim 7, further comprising, in response to the user selecting any of at least one object displayed in the sub-window, displaying, in the window, the marked region containing each of the at least one object displayed in the sub-window, and deleting the sub-window.

9. The method according to claim 8, wherein the displaying the marked region in the window comprises causing current contents of the window to shift in order to position the display of the marked region in the window.

10. The method according to claim 7, further comprising:
searching for objects related to the objects displayed in the window; and
displaying, as the sub-window, related objects found by searching and not displayed in the window.

11. The method according to claim 7, wherein displaying the sub-window comprises displaying the sub-window so that a direction in which the marked region displayed in the sub-window is present, relative to current contents of the window, is graphically indicated.

12. A non-transitory computer-readable recording medium having a computer program for display processing stored therein in a computer-readable form, the computer program comprising instructions which, when executed by a computer, perform functions comprising:

in response to a user selecting a desired object and a region surrounding the selected object in a display window of a display region of a display apparatus of the computer, putting a mark on the region and the object;

changing the window to not display the object in the marked region;

while the object of the marked region is not displayed in the display window, displaying a sub-window in a periphery of the window, the sub-window displaying the object in the marked region, wherein a transfer button is provided in the sub-window automatically, responsive to detecting that the user moved a selection pointer onto the sub-window;

responsive to detecting that the user moved the selection pointer over the transfer button, overlaying, over at least a portion of current contents of the window, an arrow depicting a direction of movement that will occur for the window if the transfer button is selected; and responsive to the user selecting the transfer button, displaying, in the window, the marked region displayed in the sub-window, and deleting the sub-window.

* * * * *